US010018276B2

(12) United States Patent
Funato et al.

(10) Patent No.: US 10,018,276 B2
(45) Date of Patent: Jul. 10, 2018

(54) TRUNNION-TYPE BALL VALVE

(71) Applicant: KITZ CORPORATION, Chiba (JP)

(72) Inventors: Masazumi Funato, Nagano (JP); Masahiro Kazama, Nagano (JP)

(73) Assignee: KITZ CORPORATION, Chiba (JP)

( * ) Notice: Subject to any disclaimer, the term of this patent is extended or adjusted under 35 U.S.C. 154(b) by 13 days.

(21) Appl. No.: 15/108,685

(22) PCT Filed: Aug. 27, 2015

(86) PCT No.: PCT/JP2015/074234
§ 371 (c)(1),
(2) Date: Jun. 28, 2016

(87) PCT Pub. No.: WO2016/067737
PCT Pub. Date: May 6, 2016

(65) Prior Publication Data
US 2016/0319940 A1 Nov. 3, 2016

(30) Foreign Application Priority Data

Oct. 28, 2014 (JP) .................. 2014-219455
Jan. 28, 2015 (JP) .................. 2015-014295

(51) Int. Cl.
F16K 5/06 (2006.01)
(52) U.S. Cl.
CPC ..................... F16K 5/06 (2013.01)
(58) Field of Classification Search
CPC .................. F16K 5/205; F16K 5/06
(Continued)

(56) References Cited

U.S. PATENT DOCUMENTS 3,472,270 A * 10/1969 Masheder ............. F16K 5/0631
137/315.19
3,667,727 A * 6/1972 Bowden ................ F16K 3/0227
251/172

(Continued)

FOREIGN PATENT DOCUMENTS

DE 10058530 A1 * 5/2002 ........... F16K 5/0642
JP 2-124377 10/1990

(Continued)

OTHER PUBLICATIONS

International Search Report dated Nov. 17, 2015 in International Application No. PCT/JP2015/074234.

Primary Examiner — Martina Tietjen
(74) Attorney, Agent, or Firm — Wenderoth, Lind & Ponack, L.L.P.

(57) ABSTRACT

A trunnion-type ball valve including a seat retainer (14) attaching a ball seat(s) to at least one side of a ball (12) having a through hole (12a) provided in a body (11). The ball is turnably provided via a stem (13), and the ball seat is attached in a protrusion-prevented and free state in an attachment groove formed in the seat retainer. An excessive pressure due to an abnormal pressure rise in a cavity upon full close or upon full open is configured to be relieved into a flow channel via a communication part provided between an inner peripheral surface of the ball seat and the attachment groove by moving the seat retainer in a direction opposite to the ball by self-tension utilizing the pressure and pushing-out the ball seat to a ball-side by the excessive pressure flowed into a rear-surface side of the ball seat in the attachment groove.

16 Claims, 12 Drawing Sheets

(58) Field of Classification Search
USPC .......................... 251/172, 175, 192, 315.08
See application file for complete search history.

(56) References Cited

U.S. PATENT DOCUMENTS

| | | | | |
|---|---|---|---|---|
| 3,930,636 A * | 1/1976 | Pugh | .................. | F16K 5/06 |
| | | | | 137/329.01 |
| 4,157,170 A * | 6/1979 | McClurg | ............... | F16K 5/0668 |
| | | | | 251/315.01 |
| 8,002,237 B2 * | 8/2011 | Hubacek | ............... | F16K 5/0668 |
| | | | | 251/172 |

FOREIGN PATENT DOCUMENTS

| | | | | |
|---|---|---|---|---|
| JP | 9-133225 | 5/1997 | | |
| JP | 2577156 | 7/1998 | | |
| JP | 2000-179712 | 6/2000 | | |
| JP | WO 2005036036 A1 * | 4/2005 | .......... | F16K 5/0678 |
| JP | 3815669 | 8/2006 | | |
| JP | 2009-41776 | 2/2009 | | |
| JP | 4812091 | 11/2011 | | |
| WO | 2013/129560 | 9/2013 | | |

* cited by examiner

TRUNNION-TYPE BALL VALVE

TECHNICAL FIELD

The present invention relates to a trunnion-type ball valve and particularly relates to an attachment structure of a ball seat and a seat retainer capable of exerting a high sealing characteristic with respect to a high-pressure fluid.

BACKGROUND ART

A trunnion-type ball valve is known as a valve which is particularly suitable for a high-pressure fluid, and the ball valve is provided to have a structure in which: normally, a ball seat serving as a valve seat is attached to a body in a state in which the ball seat is retained by a seat retainer, the ball seat is subjected to elasticity in a valve-element direction by the elastic force of a coil spring, and, when the ball seat is pushed, a fluid is sealed by the ball seat in a primary side (upstream side).

In this manner, if the ball seat and the seat retainer are separated from each other, they are provided to have a structure in which fall-off of the ball seat from the seat retainer is prevented. For example, in a ball valve of Patent Literature 1, a seat is provided with a female thread, a seal ring is provided with a male thread, and the seal ring is attached to the seat via the female thread and the male thread. A disc spring is attached to a seat back surface, and the seat and the seal ring are pressed in a valve-element direction by the disc spring. As a result, in a state in which protrusion from the seat due to loosening is prevented by mutually contacting thread ridge ends thereof, the seal ring is brought into pressure-contact with a valve element by a compression coil spring attached to the back surface side, and the gap between the contact surfaces of the seal ring and the valve element is prevented.

Furthermore, in this ball valve, a seal member is provided in the inner diameter side of the seal ring, entry of the pressure into the back surface side is prevented by this seal member, and pressure entry to the seal-ring back surface caused by protrusion of the seal ring due to a back-pressure action is prevented.

In a ball valve of Patent Literature 2, a saw-teeth-like dent-bump part is formed on a packing liner, and, when a seat packing enters this saw-teeth-like dent-bump part, the seat packing is coupled to the packing liner. In this state, the seat packing is fixed in a state in which a back surface thereof is press-fitted with the packing liner, and, as a result, protrusion due to the back-pressure action of a fluid pressure is prevented. Furthermore, back leakage from the seat packing is also prevented by press-fitting of the seat packing with the packing liner.

In a ball valve of Patent Literature 3, a valve-seat retaining ring is engaged with the back-surface-side outer periphery of a valve seat, and a fluid communication groove is circumferentially provided on an engagement surface of the valve-seat retaining ring. The valve seat is configured to be pulled back to a normal position by equalizing the pressure difference between an inlet-side fluid-channel-part pressure and a pocket-part pressure via a fluid communication hole through this fluid communication groove. Thus, protrusion, deformation, and breakage of the valve seat are to be prevented.

On the other hand, a ball valve 1 shown in FIG. 14 is provided in a state in which fall-off of a ball seat 3 from a seat retainer 2 is prevented and is structured so that the ball seat 3 is attached to the seat retainer 2 in a free state.

Also, a ball valve of this type is sometimes required to be openable/closable while a ball seat and a valve element maintain a high sealing characteristic in addition to prevention of fall-off of the ball seat. For example, in the ball valve of Patent Literature 1, in order to ensure a sealing characteristic in addition to above described prevention of protrusion of the seal ring, a seal surface of the ball seat is provided to have the same curvature as that of a seal surface of the valve element, and the seal surfaces of the ball seat and the valve element having the same curvature are provided so as to cohere to each other across the entire peripheries thereof.

Also in the ball valve of FIG. 14, as well as Patent Literature 1, a seal surface 6 formed on the ball seat 3 in a range from a primary-side seal part 4 to a secondary-side seal part 5 is provided to have the same curvature as that of a valve-element seal surface 8 at the outer periphery of a ball valve element 7.

More specifically, in the ball valve thereof, in FIG. 14, fall-off of the ball seat 3 is prevented, and the spherical shape of the ball valve element 7 and the shape of the seal surface 6 of the ball seat 3 are provided to have the same dimension; therefore, the seal surface 6 is always in a state of surface contact with the valve-element seal surface 8 in the range of the primary-side seal part 4 to the secondary-side seal part 5 in a case of low pressure to a case of high pressure so that a fluid pressure is sealed.

Patent Literature 4 discloses a ball valve which is to prevent deviated abrasion of a ball seat and prevent reduction in a sealing characteristic by retaining the ball seat by a seat retaining part in a rotatable state in a circumferential direction and rotating the ball seat in the circumferential direction along with the rotation of a ball.

In a ball valve of Patent Literature 5, the space between a bottom surface of a seat ring and a bottom surface of a seat-ring retaining groove of a seat retaining means is provided so as to be widened and, at the same time, tilted to a ball side as it gets close to the outer diameter, and pressing deformation of a case in which pressing force is applied to the seat ring is absorbed by the space so as to prevent the position of a seal part from being changed and to retain a sealing characteristic.

In each of the above described trunnion-type ball valves, generally, a resin material is used as the ball seat, and, in this case, if the temperature becomes high, the fluid is sealed while the ball seat is elastically deformed by the fluid pressure depending on the pressure thereof.

CITATION LIST

Patent Literatures

Patent Literature 1: Japanese Patent Application Laid-Open No. H9-133225
Patent Literature 2: Japanese Utility Model Application Laid-Open No. H2-124377
Patent Literature 3: Japanese Utility Model No. 2577156
Patent Literature 4: Japanese Patent No. 3815669
Patent Literature 5: Japanese Patent No. 4812091

SUMMARY OF INVENTION

Technical Problems

The ball valve of Patent Literature 1 is to prevent fall-off of the ball seat from the seat retainer. However, since this ball valve has the disc spring, the compression coil spring, and the seal member in addition to the seal ring and the seat, the number of parts becomes large, and the structure is also complicated. The seal member is disposed in the inner diameter side of the seal ring, and the compression coil spring is provided in the seal-ring back-surface side; therefore, assembly performance is also bad. In this case, the rigidity of the entire seal ring is easily reduced since many grooves or dents for part attachment are formed on the seal ring, and, in order to solve this, a high-strength material has to be used as a seal-ring material in some cases.

Furthermore, in this ball valve, there is no consideration for a relief for a case in which an abnormal pressure rise occurs in a cavity. In a case of the structure like this in which the ball seat is subjected to elasticity by the coil spring, if an abnormal pressure rise occurs in the cavity, the ball seat moves to the primary side together with a seat retainer and relieves the pressure from the part between the seat and the valve element; therefore, abrasion of the surface of the seat contacting the valve element becomes intense. As a result, a seal point becomes unstable, and a relief pressure is varied. Upon relieving, since the pressure is removed so as to forcibly open the contact part of the seat, there is also a problem that the contact surface is easily damaged.

The ball valve of Patent Literature 2 is also to prevent protrusion of the seat packing. However, since the seat packing is press-fitted and integrated with the packing liner, if the seat packing becomes a high temperature, the seat packing may protrude from the packing liner due to swelling. The seat packing is tapered in the vicinity of the back surface as a leakage preventing structure, and it is a structure to be integrated with the packing liner by a wedge effect. Therefore, dimension setting of the packing liner and the seat packing also becomes difficult. Furthermore, when the seat packing is press-fitted with the packing liner by this dent-bump structure, the assembly operation thereof also becomes difficult; wherein, for example, if the seat packing is not deformed to a predetermined state, the seat packing may undergo deviated abrasion without being housed in a predetermined position of the packing liner upon assembly and upon valve actuation. In order to prevent this, in some cases, there is a need to process a seat surface after press-fitting.

In addition to that, there is also a problem that the seat packing is easily worn due to relieving of the abnormal pressure rise in the cavity.

The ball valve of Patent Literature 3 is to reduce the pressure difference via the fluid communication groove and the fluid communication hole upon turning of the valve element and prevent protrusion and deformation of the valve seat, but does not take a measure against the abnormal pressure rise in the cavity into consideration.

Moreover, in the ball valve having the structure of above described Patent Literature 1 or FIG. 14, if a high pressure is applied from the flow channel side after assembly and in a state of a low pressure, the ball seat 3 made of resin is elastically deformed in a direction to open outward as shown by an arrow of FIG. 15 while an abutting part 9 with the seat retainer 2 serves as a center thereof. When the ball seat 3 is elastically deformed in this manner, the abutting part 9 is in the outer-diameter side compared with the primary-side seal part 4 in FIG. 14; therefore, the primary-side seal part 4 is moved in the direction to approach the ball valve element 7 by a rotation action of the ball seat 3 of outward opening centered on the abutting part 9. As a result, as shown in FIG. 15, sealing of the ball valve element 7 and the ball seat 3 is changed from the surface contact, which is from the primary-side seal part 4 to the secondary-side seal part 5, to line contact in the side of the primary-side seal part 4, the sealing surface-contact pressure of the primary-side seal part 4 is locally increased by this sealing of the line contact, and the ball seat 3 may be partially deformed. When the valve is subjected to a rotary operation in this state, the primary-side seal part 4 cannot withstand the surface contact pressure and causes deviated abrasion, which easily leads to leakage of the fluid.

Furthermore, in FIG. 15, a rotation action occurs at the ball seat 3 with the abutting part 9 serving as a basic point, there is a positional relation in which the primary-side seal part 4 serving as a sealing part is closer to the ball valve element 7 than the secondary-side seal part 5 is, it becomes difficult to seal the ball valve element 7 by the secondary-side seal part 5, and it becomes difficult to avoid increase in the local surface-contact pressure by the primary-side seal part 4. This phenomenon becomes more notable as the diameter of the valve is increased, and it becomes difficult to ensure the sealing characteristic from a low pressure to a high pressure since the sealing performance in a case of high pressure is significantly reduced.

Patent Literature 4 is to prevent deviated abrasion by the rotation in the circumferential direction while preventing fall-off of the ball seat, and Patent Literature 5 is to prevent changes in the position of the seal part by absorbing pressing deformation of the seat ring while preventing fall-off of the ball seat. However, in either case, if the fluid is at a high pressure, as well as the ball valve of FIG. 14, the ball seat is elastically deformed in the opening direction, the contact with the ball valve element is changed to be closer to line contact from surface contact, and deviated abrasion may occur on the seal surface and reduce sealing performance.

The present invention has been developed in order to solve the conventional problems, and it is an object thereof to provide a trunnion-type ball valve that can prevent fall-off of a ball seat from a seat retainer, can relieve the abnormal pressure rise in a cavity while avoiding abrasion of the ball seat, can improve workability and assembly performance by ensuring strength while suppressing increase in the number of parts and simplifying the structure, and can improve the durability of the ball seat by improving the sealing characteristics of the ball seat and a valve element even in a case of high pressure and preventing leakage.

Solution to Problems

In order to achieve the above described object, the invention according to claim 1 is a trunnion-type ball valve having a seat retainer disposed to attach a ball seat (s) to one side or both sides of a ball having a through hole provided in a body, the ball turnably provided via a stem, and the ball seat attached in a protrusion-prevented and free state in an attachment groove formed in the seat retainer; wherein an excessive pressure due to an abnormal pressure rise in a cavity upon full close or upon full open is configured to be relieved into a flow channel via a communication part provided between an inner peripheral surface of the ball seat and the attachment groove by moving the seat retainer in a direction opposite to the ball by self-tension utilizing the pressure and pushing-out the ball seat to a side of the ball by the excessive pressure flowed into a rear-surface side of the ball seat in the attachment groove.

The invention according to claim 2 is the trunnion-type ball valve, wherein an engagement part provided in an opening side of an inner periphery of the attachment groove is opposed to a latch part provided on an outer peripheral attachment side of the ball seat so as to be mutually latchable in an insertion direction to prevent protrusion of the ball seat from the attachment groove of the seat retainer; and the ball seat is attached to the attachment groove in the free state.

The invention according to claim 3 is the trunnion-type ball valve, wherein a female thread part provided on the inner periphery of the attachment groove serves as the engagement part, a female thread part of the ball seat serves as the latch part and screwed with the male thread part, and a rear end side of the male thread part and a rear end side of the female thread part are provided to be mutually latchable to prevent protrusion of the ball seat.

The invention according to claim 4 is the trunnion-type ball valve, wherein a thread ridge at an inner end of the female thread part and a thread ridge at an outer end of the male thread part are mutually latched to prevent protrusion of the ball seat.

The invention according to claim 5 is the trunnion-type ball valve, wherein at least one relief groove constituting the communication part is formed on the inner peripheral surface of the ball seat or on the attachment groove of the seat retainer opposed to the inner peripheral surface.

The invention according to claim 6 is the trunnion-type ball valve, wherein an inner-diameter dimension of an A part serving as a supporting-point position of back-surface sealing of the ball seat is provided in a side closer to an inner diameter than a seal part of the ball seat is, the ball seat in a case of high pressure is configured to be elastically deformed so as to be opened while using the A part as a supporting point and seal the seal part from an outer-diameter side toward an inner-diameter side at least in a surface-contact state.

The invention according to claim 7 is the trunnion-type ball valve, wherein a positional relation of the A part serving as the supporting-point position and a sealing part B and a sealing part C serving as the seal part is A<C<B with respect to the inner-diameter dimension.

The invention according to claim 8 is the trunnion-type ball valve, wherein, in a case of an initial stage of assembly or a low fluid pressure, the sealing part B maintains a line-contact state, and the sealing part C is in a state not contacting a surface of the ball.

The invention according to claim 9 is the trunnion-type ball valve, wherein the seal part of the ball seat is formed into a spherical surface, a center of the spherical surface is disposed on a flow-channel axial core in the body as well as a center of the ball, and the inner diameter thereof is formed to be reduced than that of a spherical shape of the ball.

The invention according to claim 10 is the trunnion-type ball valve, wherein a predetermined clearance is provided between an inner peripheral surface of the attachment groove and a seal-surface-side outer peripheral surface of the ball seat so that the ball seat is opened in a case of high pressure and so that excessive opening thereof is suppressed.

The invention according to claim 11 is the trunnion-type ball valve, wherein a clearance is provided between an inner peripheral surface of the latch part formed on the attachment groove and an outer-peripheral-surface-side of the ball seat.

Advantageous Effects of Invention

According to the invention according to claim 1, the ball seat is attached while preventing protrusion into the attachment groove of the seat retainer, and, even in a case in which a high-pressure fluid flows or in a case in which the valve is slightly opened, a high sealing characteristic can be exerted while preventing fall-off of the ball seat. The ball seat is attached to the seat retainer in the free state. Even in a case in which an abnormal pressure rise occurs upon full close or upon full open, the seat retainer is moved in the direction opposite to the ball by so-called self-tension utilizing the pressure in the cavity, and the excessive pressure caused by the abnormal pressure rise in the cavity is relieved into the flow channel via the communication part between the inner peripheral surface of the ball seat and the attachment groove, thereby preventing abrasion of the contact surfaces of the ball seat and the ball upon relief of the excessive pressure caused by the abnormal pressure rise. Therefore, the abnormal pressure rise can be reliably avoided by stabilizing a relief point in a case of a valve-closed sealing, and leakage can be avoided also with respect to a high-pressure fluid by maintaining a high sealing characteristic in a case of valve close. Moreover, since a relief mechanism can be formed by the ball seat and the seat retainer, the internal structure can be simplified by suppressing increase in the number of parts, the ball seat can be attached while ensuring strength without increasing grooves or dents, and workability and assembly performance can be also improved.

According to the invention according to claim 2, the ball seat is attached in the free state in the attachment groove of the seat retainer. Therefore, when the force in the protruding direction is applied to the ball seat, the ball seat is movable with respect to the seat retainer, and protrusion of the ball seat can be prevented by the engagement part and the latch part opposed to each other while causing the fluid between the back surface side of the ball seat and the seat retainer to flow to a secondary side.

According to the invention according to claim 3, the female thread part serves as the engagement part, the male thread part serves as the latch part, and these are provided to be latchable in the insertion direction. Therefore, the ball seat can be easily attached to the seat retainer by utilizing screwing thereof, and protrusion of the ball seat can be reliably prevented by latching of the rear end side of the male thread part and the rear end side of the female thread part opposed to each other after they are screwed together.

According to the invention according to claim 4, protrusion of the ball seat is reliably prevented by the mutual latching of the thread ridges while maintaining the free state of the ball seat by preventing re-screwing of the ball seat and the seat retainer. Moreover, upon production, the thread ridges can be easily formed without carrying out complicated processing, and assembly is also simple.

According to the invention according to claim 5, the cavity and the flow-channel side can be communicated with each other by the relief groove, the seat retainer and the ball seat are moved in the mutually opposed direction by the self-tension, and, when the back surface of the ball seat is separated from the seat retainer, the abnormal pressure rise can be eliminated by discharging the pressure in the cavity via the relief groove.

According to the invention according to claim 6, while preventing fall-off of the ball seat from the seat retainer, the ball seat is attached in the free state in the attachment groove, the ball seat in a case of low fluid pressure is brought into line contact with the ball by the outer-diameter side of the seal part, and the ball seat in a case of high pressure is elastically deformed so as to be opened while using the A part as a supporting point and seals the ball by the seal part in the surface-contact state. Therefore, even when a high-pressure fluid flows to a large-diameter valve, the sealing characteristic of the ball seat and the valve element can be improved, and leakage can be reliably prevented. Since sealing can be carried out while minimally suppressing the contact of the ball to the seal part, generation of a local surface pressure at the sealing part can be prevented while preventing the seal-part inner-diameter side from being scraped by turning of the ball in a case of low pressure. As a result, abrasion of the ball seat can be prevented, and durability can be also improved.

According to the invention according to claim 7, if the fluid pressure is a low pressure, the sealing part B contacts the ball while the sealing part C is prevented from contacting the ball in a state in which the A part serving as the supporting-point position is sealing the back surface, and leakage can be prevented while preventing abrasion of the ball seat by the line-contact sealing by the sealing part B. If the fluid pressure is a high pressure, the ball seat is elastically deformed in the direction of opening with respect to the ball centrally from the A part serving as the supporting-point position; as a result, the sealing-part-C side contacts the ball to carry out surface contact in which the sealing part B in the outer-diameter side to the vicinity of the sealing part C in the inner-diameter side serves as the seal part. Thus, while preventing deviated abrasion of the seal part by preventing generation of local surface pressure, leakage can be reliably prevented by improving the sealing characteristic.

According to the invention according to claim 8, if the fluid pressure is a low pressure, while suppressing wasteful abrasion by preventing the sealing part B from contacting the ball, the sealing characteristic that can prevent leakage of the fluid can be ensured.

According to the invention according to claim 9, if the fluid pressure is a high pressure, the ball seat is elastically deformed so as to be opened with respect to the ball, and the spherical surface of the seal part becomes state in which it is in surface contact with the outer periphery of the ball. As a result, while preventing deviated abrasion of the seal part, the sealing characteristic can be improved.

According to the invention according to claim 10, in a case of high pressure, high sealability is maintained by the elastic deformation to the clearance side without suppressing deformation of the ball seat, and the flexibility thereof can be maintained by avoiding transmission of excessive stress caused by contact of the attachment groove to the ball seat. On the other hand, excessive opening of the ball seat is prevented via the clearance. Therefore, leakage can be prevented by maintaining the sealing state of the surface contact of a case of high pressure.

According to the invention according to claim 11, the ball seat is attached in the free state in a state in which protrusion from the seat retainer is prevented by the latch part, and the ball seat can be elastically deformed so as to be able to seal the ball from a case of low pressure to a case of high pressure.

REFERENCE SIGNS LIST

10 VALVE MAIN BODY
11 BODY
12 BALL
12a THROUGH HOLE
13 STEM
14 SEAT RETAINER
15 BALL SEAT
15a BACK SURFACE
16 BALL SURFACE
25 SEAL SURFACE (SEAL PART)
27 INNER PERIPHERAL SURFACE
30 MALE THREAD PART (LATCH PART)
30a THREAD RIDGE
31 RELIEF GROOVE
32 ATTACHMENT GROOVE
32a INNER PERIPHERAL SURFACE
33 FEMALE THREAD PART (ENGAGEMENT PART)
33a THREAD RIDGE (ENGAGEMENT PART)
35 CAVITY
40 COMMUNICATION PART
A PART SUPPORTING-POINT POSITION
B, C SEALING PART
CL CLEARANCE
L1, L2, L3 INNER-DIAMETER DIMENSIONS
O FLOW-CHANNEL CENTRAL AXIS (FLOW-CHANNEL AXIAL CORE)

DESCRIPTION OF EMBODIMENTS

Figure 1:
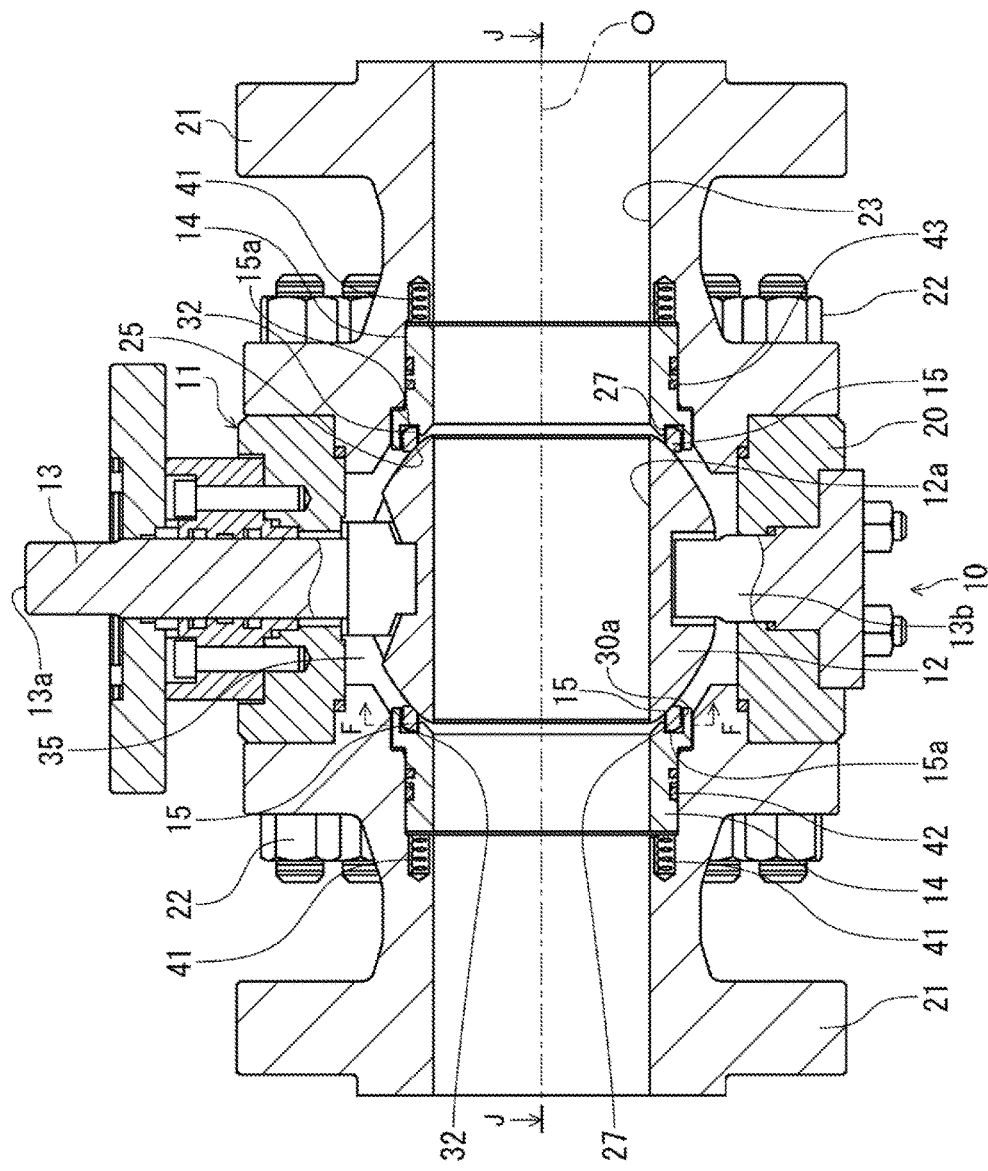
FIG. 1 is a vertical sectional view showing a first embodiment of a trunnion-type ball valve of the present invention.
Figure 3:
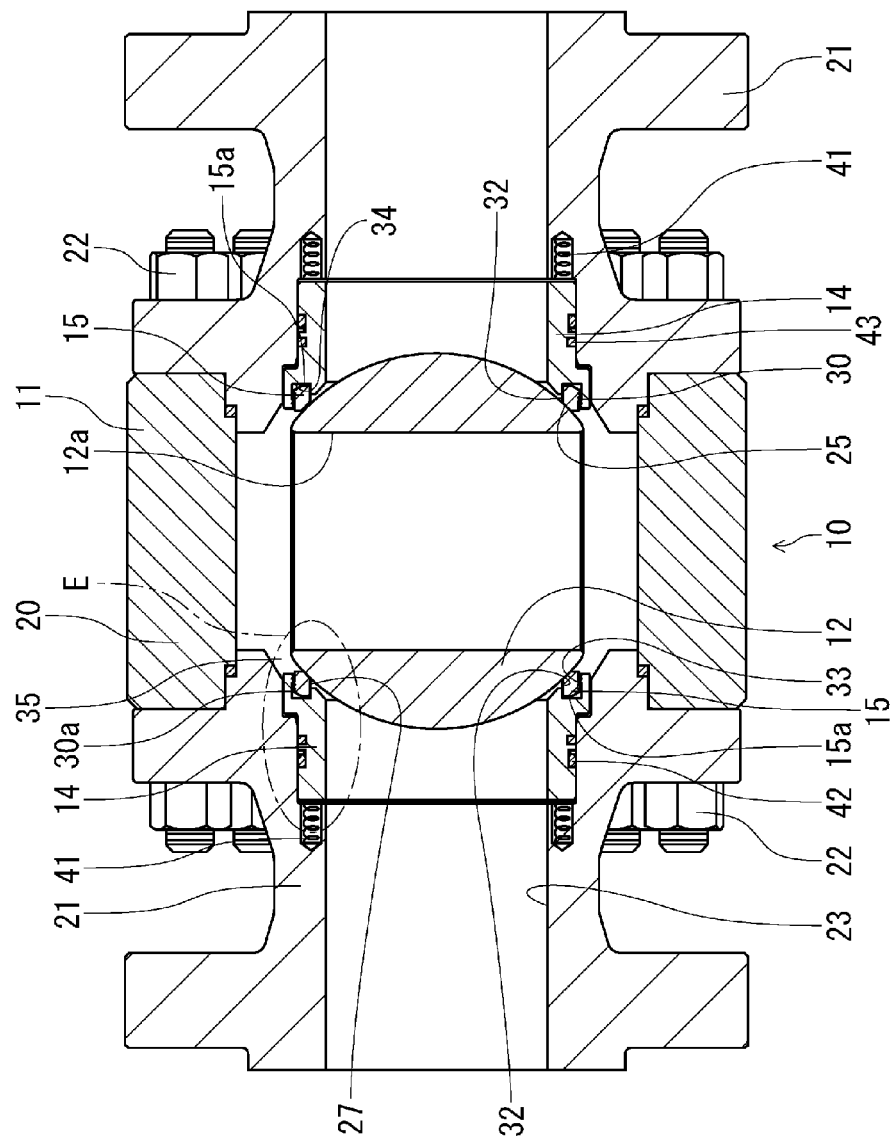
FIG. 3 is a J-J sectional view of FIG. 1.

Hereinafter, embodiments of trunnion-type ball valves in the present invention will be explained based on drawings. In FIG. 1, an embodiment of the trunnion-type ball valve of the present invention is shown in a valve opened state, and FIG. 3 shows a J-J sectional view of FIG. 1, in other words, a central transverse sectional view of the trunnion-type ball valve of the present invention.

The trunnion-type ball valve (hereinafter, referred to as a valve main body 10) of FIG. 1 has a body 11, a ball 12, a stem 13, seat retainers 14, and ball seats 15 and is particularly suitable for a case in which it has a large diameter and used for a high-pressure fluid of a class (nominal pressure) of about 150 to 2500.

The body 11 has an annular body 20 and annular caps 21, 21 in both sides, wherein these are formed of carbon steel, a stainless material, or the like and are integrated by bolts/nuts 22.

In the body 11, the ball 12 is turnably provided via the stem 13 consisting of an upper stem 13a and a lower stem 13b, the seat retainers 14 are disposed in both sides, in other words, in the up/down-stream sides of the ball 12, and the ball seats 15 are attached to the seat retainers 14. The ball 12 is formed by using stainless steel as a material and is provided with a through hole 12a, which can communicate with a flow channel 23 in the valve main body 10. In the present embodiment, the ball seats 15 and the seat retainers 14 are attached to the up/down-stream sides of the ball 12; however, these are only required to be provided in one or both of the up/down-stream sides. As shown in FIG. 1, in a case of the ball-valve main body 10 in which the ball seats 15 and the seat retainers 14 are attached to the up/down-stream sides, either side of the right side or the left side in the drawing may serve as a primary side.

The ball seat 15 is formed of a resin material such as PTFE (polytetrafluoroethylene), nylon, or PEEK (polyether etherketone) in an elastically-deformable annular shape and is provided with a seal surface 25 in the abutting side of the ball 12, and a circular inner peripheral surface 27 is continued from the seal surface 25 to the side of a back surface 15a of the ball seat 15.

A male thread part 30 is provided as a latch part in the seat-retainer-14-attachment side of the outer periphery of the ball seat 15, and the male thread part 30 is provided by a length of about half of the attachment-direction thickness of the ball seat 15.

Figure 4:
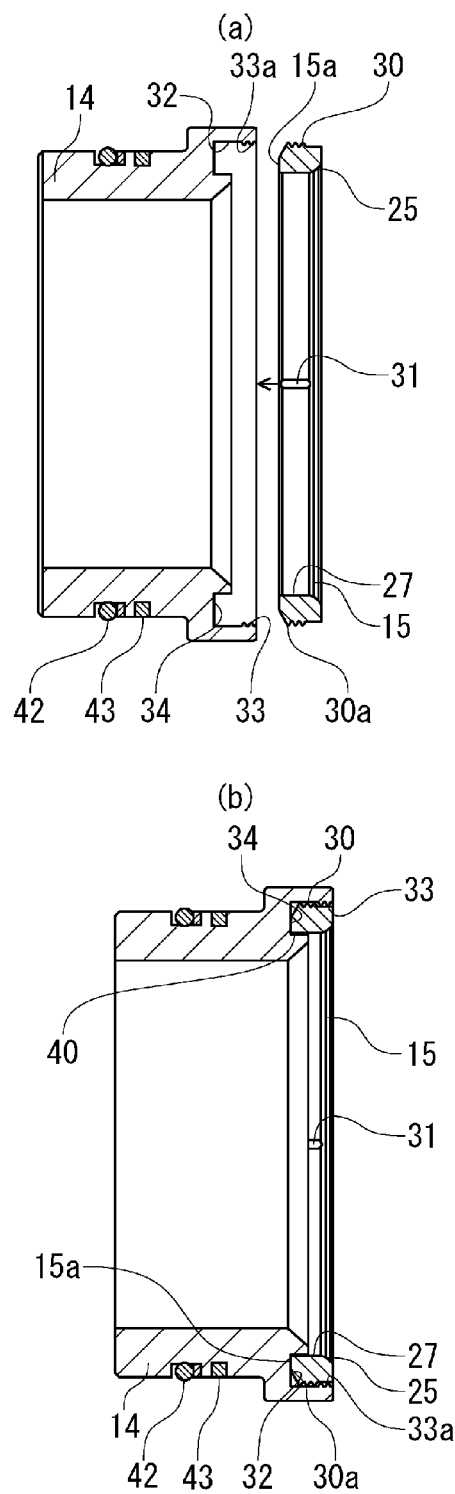
FIG. 4 shows vertical sectional views showing assembly steps of a ball seat.

In FIG. 3 and FIG. 4, at least one relief groove(s) 31 is formed on the inner peripheral surface 27 of the ball seat 15. The relief groove 31 is provided by a predetermined depth from the vicinity of the boundary of the inner peripheral surface 27 with the seal surface 25 to the back-surface-15a side of the ball seat 15, and the relief groove 31 is provided so that a communication part 40, which is provided between the inner-peripheral-surface-27 side and the outer-peripheral-surface side (male-thread-part-30 side) of the ball seat 15 after attachment to the seat retainer 14, can be formed. The relief groove(s) 31 are desired to be provided at equal intervals at a plurality of locations of the inner peripheral surface 27. Also, the relief groove(s) 31 may be provided in a later-described attachment groove 32 of the seat retainer 14, which is opposed to the inner peripheral surface 27.

Although not shown in the drawings, in a case of a large-diameter valve having a size of 10 B or more, grooves or holes which enable fastening or detachment by a fastening jig may be provided in the outer periphery of the ball seat 15, and, in this case, assembly of the ball seat 15 is facilitated.

On the other hand, the seat retainer 14 is formed of a metal material such as carbon steel or a stainless material in an approximately cylindrical shape and is formed so that the diameter in the side to be attached to the ball seat 15 is formed to be somewhat increased, and the annular attachment groove 32 in which the ball seat 15 can be inserted is provided therein. In the opening side of the inner periphery of the attachment groove 32, a female thread part 33, which can be screwed with the male thread part 30, is provided as a convex engagement part. The female thread part 33 is provided from the opening side by about the half of the length of the attachment groove 32; and, in a case of the valve main body 10 having a size of 3 B, a thread ridge 33a thereof has the same specifications as a thread ridge 30a of the male thread part 30 of the ball seat 15. In the back side of the female thread part 33, a bottomed hole 34 having a larger diameter than the outer diameter of the male thread part 30 is provided, the depth of the bottomed hole 34 is formed to be larger than the length of the male thread part 30, and the inner diameter of the bottomed hole 34 is formed to be somewhat larger than the outer diameter of the male thread part 30.

In a state that the female thread part 33 is screwed with the male thread part 30 and that the male thread part 30 is housed in the bottomed hole 34, the above described ball seat 15 is inserted in the attachment groove 32. After the male thread part 30 and the female thread part 33 are screwed, a rear end side of the male thread part 30 and a rear end side of the female thread part 33 are opposed to each other so that they can be mutually latched in the insertion direction of the male thread part 30; as a result, the ball seat 15 is prevented from protruding from the attachment groove 32, and the ball seat 15 is attached in a free state, in other words, in a movable state with respect to the attachment groove 32 at least in the direction of a flow-channel central axis O.

Figure 5:
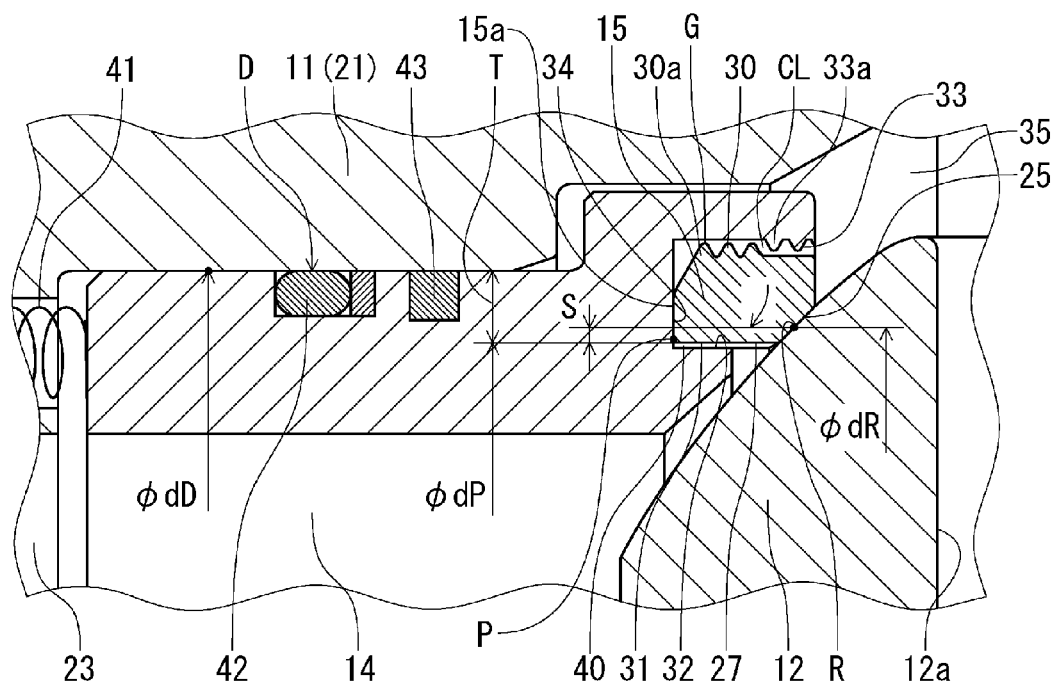
FIG. 5 is a partially enlarged sectional view showing a state upon occurrence of an abnormal pressure rise.

After the ball seat 15 is attached, in FIG. 5, when an excessive pressure caused by an abnormal pressure rise in a cavity 35 of the valve main body 10 in a case of full close or a case of full open, in other words, when a high pressure exceeding the fluid pressure in the flow channel 23 is generated in the cavity 35, the seat retainer 14 is moved in the direction opposite to the ball 12 by self-tension utilizing this high pressure, the ball seat 15 is pushed out to the ball-12 side by the above described excessive pressure which has flowed into the back-surface-15a side of the ball seat 15 in the attachment groove 32, and, at this point, the excessive pressure caused by the abnormal pressure rise in the cavity 35 is configured to be relieved into the flow channel 23 via the communication part 40. Herein, the abnormal pressure rise in the cavity 35" refers to a phenomenon in which the pressure in the closed space (cavity 35) surrounded by the body 11, the ball 12, the ball seat 15, the seat retainer 14, etc. is increased in the valve main body 10 which is in a valve-closed state because of increase in the temperature of the fluid or increase in the temperature of the environment in which the valve main body 10 is installed. Also, "the ball seat 15 is pushed out to the ball-12 side" is not limited to a state in which the position of the ball seat 15 is moved to the ball-12 side, but refers to at least a state in which the ball seat 15 does not follow the seat retainer 14, but is pressed against the ball 12.

Figure 7:
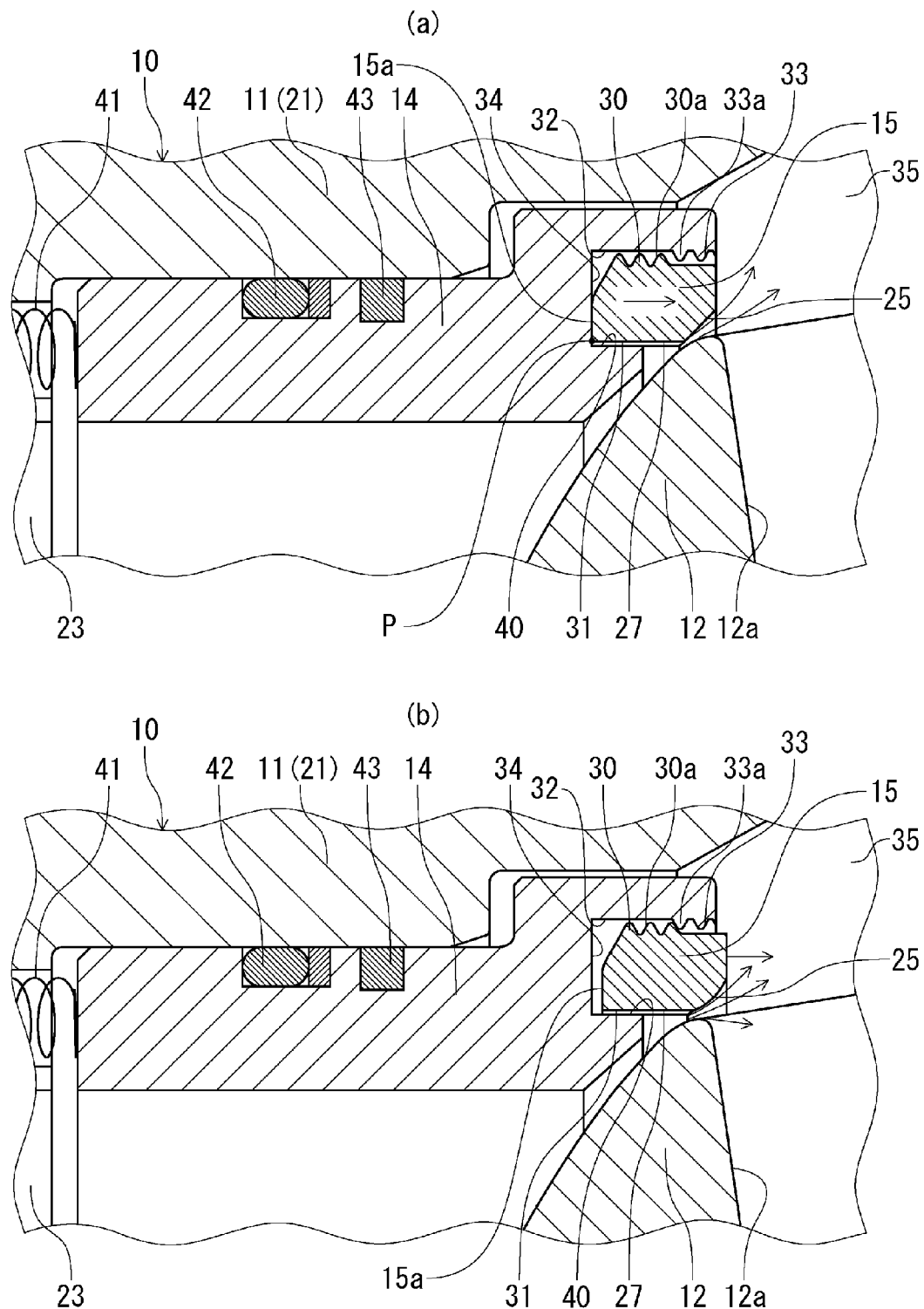
FIG. 7 shows partially enlarged sectional views showing a slightly opened state of a ball in a region E of FIG. 3.

Herein, as shown in FIG. 7, if a pressure is applied to the back-surface-15a side of the ball seat 15, the push-out load generated at the ball seat 15 acts on the thread ridges 30a and 33a; therefore, the ball seat 15 and the seat retainer 14 have to be provided so as to set the thread-ridge heights with which the material strength (shear strength of the thread ridges) that prevents protrusion of the ball seat 15 with respect to the pressure applied to the back surface 15a can be ensured. In this case, dimensions are set so that the force applied to the thread ridges 30a and 33a is prevented from exceeding the yield point of the material of the ball seat 15 and that the thread ridges are mutually latched even when the ball seat 15 contracts in a case of low temperature in consideration of a minimum use temperature of the valve main body 10.

The thread ridges 30a and 33a are desired to be fine threads, and, in that case, the heights of the thread ridges can be adjusted while shortening the thread lengths as much as possible and ensuring the number of thread ridges. Moreover, fine threads have short pitches and are therefore preferred in the trunnion-type ball valve of the present invention also in a point that the part that becomes incomplete threads in a circumferential direction is small.

In the present embodiment, a case of the valve main body 10 having a size 3 B is configured to have: a ball-seat material: PTFE, a thread-ridge height: about 0.8 mm, a thread pitch: 1.5 mm (fine threads are used), a minimum use temperature: −46° C., a contraction amount in the radial direction of the ball seat: about 0.5 mm, and allowance: about 0.6 mm (thermal contraction in the metal side is also taken into consideration).

When the ball seat 15 is to be attached to the seat retainer 14, in FIG. 4 (*a*), the ball seat 15 is rotated in a screw-in direction and screwed in the direction of an arrow while the male thread part 30 is positioned at the attachment groove 32. As shown in FIG. 4 (*b*), when the ball seat 15 is screwed in until the thread ridge 30*a* is detached from the thread ridge 33*a*, the thread coupling thereof is uncoupled, and the ball seat 15 becomes a free state in a state in which the ball seat 15 is retained with respect to the seat retainer 14.

In this process, since the depth of the bottomed hole 34 is larger than the length of the male thread part 30 as described above, the ball seat can be inserted until the thread ridge 30*a* reliably moves over the region of the thread ridge 33*a* and the male thread part 30 is housed in the bottomed hole 34, and a clearance CL in the insertion direction (the direction of the flow-channel central axis O of FIG. 1) is provided between the thread ridges 30*a* and 30*a* as shown in FIG. 5. Since the inner diameter of the bottomed hole 34 is somewhat larger than the outer diameter of the male thread part 30, a gap G in the radial direction is also provided therebetween, and, by virtue of the gap G, the ball seat 15 can be moved forward/backward in the range of the clearance CL of the seat retainer 14 in a state of low sliding resistance. The dimension setting of sizes such as the clearance CL and the gap G is set in consideration of cold/ward differences due to differences in environmental temperatures and assembly locations in assembly. The case of the present embodiment is provided so as to support the assembly temperatures which are maximally 40° C. in the summer and minimally 10° C. in the winter.

After the assembly, the ball seat 15 is rotated in the direction opposite to the screw-in direction to confirm that the ball seat 15 is not screwed again or does not fall off. In this case, the ball seat 15 is rotated until the highest parts (complete thread parts) of the thread ridge 33*a* of the seat retainer 14 and the thread ridge 30*a* of the ball seat 15 are mutually latched so that the positions of starting parts of thread (rear end sides of incomplete thread parts) do not mutually meet. Thus, re-screwing after the ball seat 15 is attached to the seat retainer 14 is prevented so that the ball seat 15 reliably becomes movable.

Figure 2:
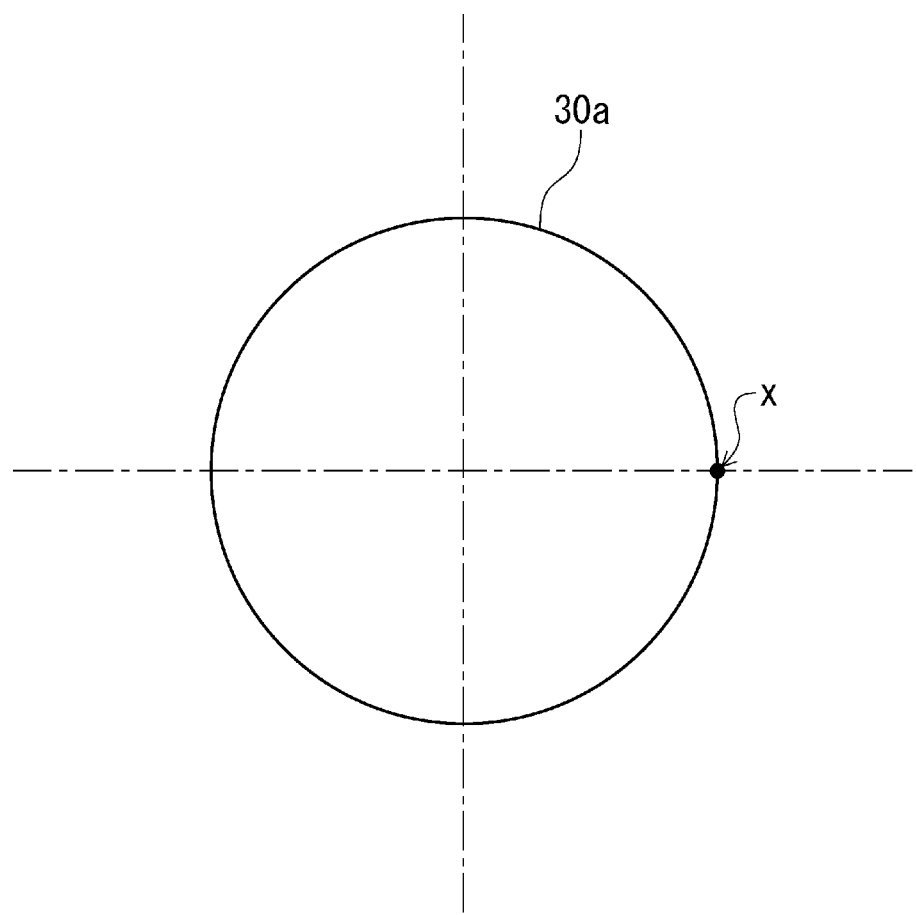
FIG. 2 is a F-F enlarged brief sectional view of FIG. 1.

Herein, if the thread ridge 30*a* is compared to a clock in FIG. 2, the starting part of the thread tip is preferred to be disposed to avoid a position x at 3 o'clock. This is for a reason that, when the valve main body 10 in a valve-closed state is to be brought into a valve-opened state by rotating the stem 13 counterclockwise, the flow channel 23, which has been closed by the ball 12, starts opening from the position x at 3 o'clock, and, therefore, the ball seat 15 easily protrudes if the flow rate at the beginning of opening of the valve is fast. Specifically, the highest parts of the thread ridge 33*a* of the seat retainer 14 and the thread ridge 30*a* of the ball seat 15 are preferred to be disposed at the above described position of 3 o'clock.

In the above described embodiment, the male thread part 30 is provided in the outer peripheral side of the ball seat 15, and the female thread part 33 is provided on the seat retainer 14. However, the female thread part may be provided on the inner peripheral side of the ball seat 15, the male thread part may be provided on the seat retainer 14 (both of them are not shown in the drawings), and the ball seat 15 may be attached to the attachment groove 32 of the seat retainer 14 in a free state while screwing them together in a manner similar to that described above.

Meanwhile, the latch part 30 and the engagement part 33 may be those other than threads, and these can be provided in various shapes as long as the latch part 30 and the engagement part 33 can be mutually latched, can prevent the ball seat 15 from protruding from the seat retainer 14, and can attach the ball seat 15 to the attachment groove 32 in a free state.

Next, actions in the above described embodiment of the trunnion-type ball valve of the present invention will be explained.

The trunnion-type ball valve of the present invention is configured to be able to seal a high-pressure fluid by the ball seat 15, which is prevented from protruding in the attachment groove 32 of the seat retainer 14 and is attached in a free state in FIG. 5. Therefore, the structure can be simplified while reducing the number of parts to a minimum, and the ball seat 15 can be attached only by screwing into the seat retainer 14.

In assembly thereof, the ball seat 15 can be inserted to the bottomed hole 34 by screwing the male thread part 30 and the female thread part 33 together; therefore, without applying unnecessary force, the ball seat can be precisely and easily attached to a predetermined position with a small number of assembly manhours while preventing abrasion or damage. In this process, without the need of special jig, tool, etc., the attachment can be carried out while providing the sufficient clearance CL and gap G between the seat retainer 14 and the ball seat 15, generation of excessive stress is prevented from an initial state of assembly, and durability in actuation is also good. Furthermore, the assembly can be carried out in a state not readily affected by the environmental temperature.

Moreover, since attachment by press-fitting is avoided by screw-in of the ball seat 15, there are many options of seat materials, for example, various materials such as a material for low temperature, a material for high temperature, a low-strength material, or a high-strength material can be used, and attachment is facilitated also in a case in which the ball seat 15 is provided by a high-strength material. After the ball seat 15 is completely screwed in, the ball seat 15 can be attached in an idling state in the bottomed-hole-34 side; therefore, natural loosening or fall-off of the ball seat 15 can be prevented without additionally providing a member for loosening prevention.

If the valve main body 10 is in a full closed state, as shown in FIG. 3, the ball seat 15 is pressed against the ball 12 by a coil spring 41 via the seat retainer 14, and, by virtue of this, the seal surface 25 of the ball seat 15 cohesively seals the ball 12 across the entire periphery thereof, thereby preventing leakage. In this case, the part between the seat retainer 14 and the cap 21 is sealed by an O-ring 42 and a packing 43.

As shown in FIG. 7 (*a*), the back surface 15*a* of the ball seat 15 coheres to the seat retainer 14 at a seal point P at an innermost diameter position and prevents the fluid in the flow channel from passing to the cavity 35 from this part.

If the valve main body 10 is subjected to an opening actuation and obtains a slightly opened state, the ball seat 15, which has been pressed against the ball 12 in the above described manner, no longer has a pressing target because of rotary movement of the ball 12; therefore, the fluid pressure which has flowed via the communication part 40 is applied to a chamfered part (not shown in the drawing) in the vicinity of the seal point P of the back surface 15a of the ball seat 15, and the ball seat 15 is instantly pushed out to the ball-12 side as shown in FIG. 7 (b).

At this point, the rear ends of the thread ridge 30a of the male thread part 30 and the thread ridge 33a of the female thread part 33 abut (latched) each other, thereby preventing protrusion of the ball seat 15. When the pressure applied to the back surface 15a of the ball seat 15 and the pressure in the cavity 35 become the same pressure, the force that push out the ball seat 15 to the ball-12 side is eliminated.

When the valve main body 10 becomes a full opened state, as shown in FIG. 1, the seal surface 25 of the ball seat 15 cohesively seals the ball 12 again across the entire periphery.

When the pressure in the cavity 35 becomes high due to an abnormal pressure rise, as shown in FIG. 5, the ball seat 15 is pushed by this pressure and is tilted to the inner-diameter side as shown by an arrow in the drawing. By this deformation, the ball seat 15 and the ball 12 carries out sealing by a seal diameter φdR at a seal point R which has a somewhat smaller diameter than the seal point of the point before occurrence of the abnormal pressure rise, and the ball seat 15 and the seat retainer 14 carries out sealing by a back-surface seal diameter φdP at the seal point P.

The pressure in the cavity 35 (cavity pressure) is applied to the ball seat 15 from both of the seal-surface-25 side and the back-surface-15a side. Herein, the seal-surface-25 side and the back-surface-15a side are provided with a difference S in the seal diameters so that the seal points have a relation of "the seal diameter φdR">"the back-surface seal diameter φdP". By utilizing the difference S in the diameters, the force applied to the back-surface side of the ball seat 15 by the cavity pressure is configured to be larger than the force applied to the ball-12 side, and the ball seat 15 is set so as to be pushed out to the ball-12 side.

The push-out force can be expressed by [the cavity pressure PR]×[pressure-receiving area M of the cavity pressure at the back surface of the ball seat 15].

Also, the pressure-receiving area M can be expressed by the pressure-receiving area M=(φdR−φdP)²×π×4.

On the other hand, the cavity pressure is applied to the seat retainer 14 from both of the cap-21 side and the attachment-groove-32 side of the ball seat 15. In the cap-21 side, the seat retainer 14 is sealed with the inner periphery of the cap 21 by the O-ring 42. In the present embodiment, this seal point is expressed as D, and the seal diameter thereof is shown as a retainer seal diameter φD.

Herein, in the cap-21 side and the attachment-groove-32 side of the seat retainer 14, a difference T is provided in the seal diameters so that the seal points have a relation φdD>φdP. By utilizing the difference T in the diameters, the seat retainer 14 is set so as to be pulled back by the cavity pressure to the opposite side of the ball 12 against the elastic force of the coil spring 41.

This pull-back force is also referred to as self-tension and can be expressed by [the cavity pressure PR]×[pressure-receiving area N of the cavity pressure at the attachment groove 32 of the ball seat 15]. Also, the pressure-receiving area N can be expressed by the pressure-receiving area N=(φdD−φdP)²×π×4.

Figure 6:
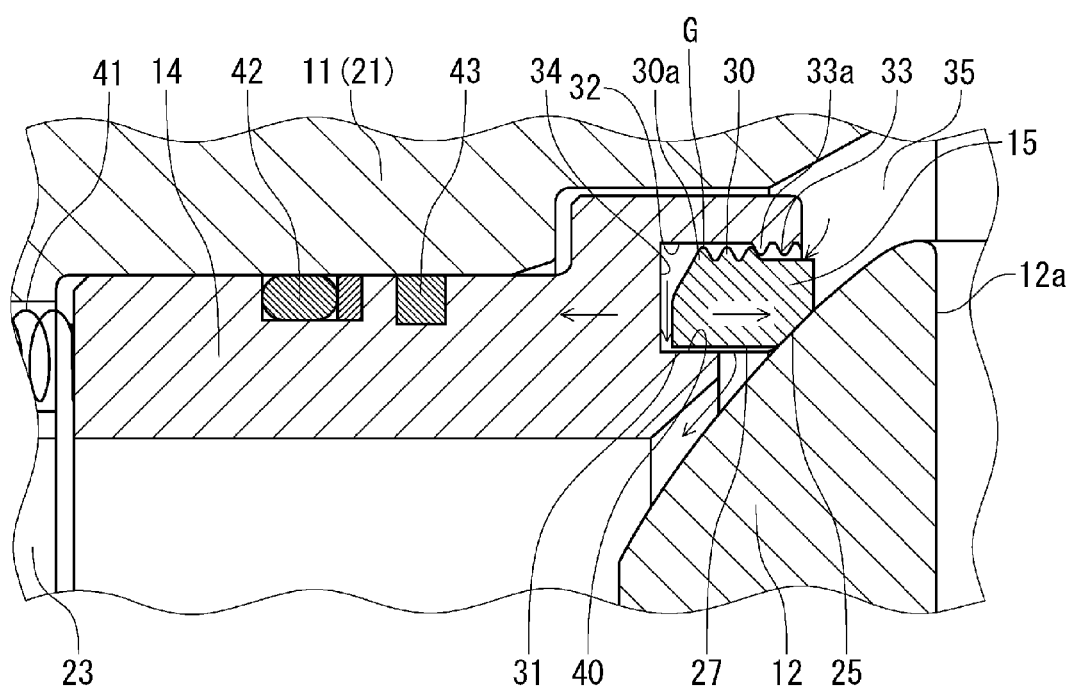
FIG. 6 is a partially enlarged sectional view showing a state in which the ball seat of FIG. 5 is moved.

A state in which the ball seat 15 is pushed out to the ball-12 side by the cavity pressure is shown in FIG. 6. In this manner, the excessive pressure from the cavity 35 which flows into the gap G between the male thread part 30 of the ball seat 15 in the attachment groove 32 and the female thread part 33 of the seat retainer 14 pushes out the ball seat 15 to the ball-12 side, and the excessive pressure in the cavity 35 is relieved into the flow channel in the primary side of the ball 12 from the communication part 40 between the inner peripheral surface 27 of the ball seat 15 and the attachment groove 32 and through the relief groove 31.

Then, the seat retainer 14 is also pulled back to the side opposite to the ball 12 by the cavity pressure as described above. Therefore, in cooperation with the pushed-out ball seat 15, the gap G can be quickly formed between the back surface 15a of the ball seat 15 and the attachment groove 32 of the seat retainer 14, and the excessive pressure in the cavity 35 can be relieved to the primary-side flow channel 23 from the back surface 15a of the ball seat 15 via the communication part 40.

In this manner, the ball seat 15 moves in a free state in the attachment groove 32 of the seat retainer 14. Even when the pressure in the cavity 35 abnormally rises due to some factors, since the mechanism which can release the pressure to the flow channel side is provided, a so-called self-relief function is exerted, the position of the seal point P in the back-surface side always become constant to stabilize this self-relief function, the abnormal pressure rise is reliably eliminated, and the directionality of self-relief can be also easily controlled.

Even when the ball seat 15 is swelled by the high-pressure fluid and increases a volume, the amount corresponding to this volume increase can be alleviated in the clearance CL, and abrasion of the seal surface 25 due to escaping of the ball seat 15 or swelling to the ball-12 side can be avoided.

In this case, protrusion of the ball seat 15 due to the back-pressure action of the fluid pressure can be controlled by the relation between the shear strength of the thread ridge and the ball-seat back pressure. Therefore, when the ball seat 15 is formed while adjusting the relation between the material strength and the back-surface-side pressure-acting area, protrusion can be reliably prevented.

Figure 8:
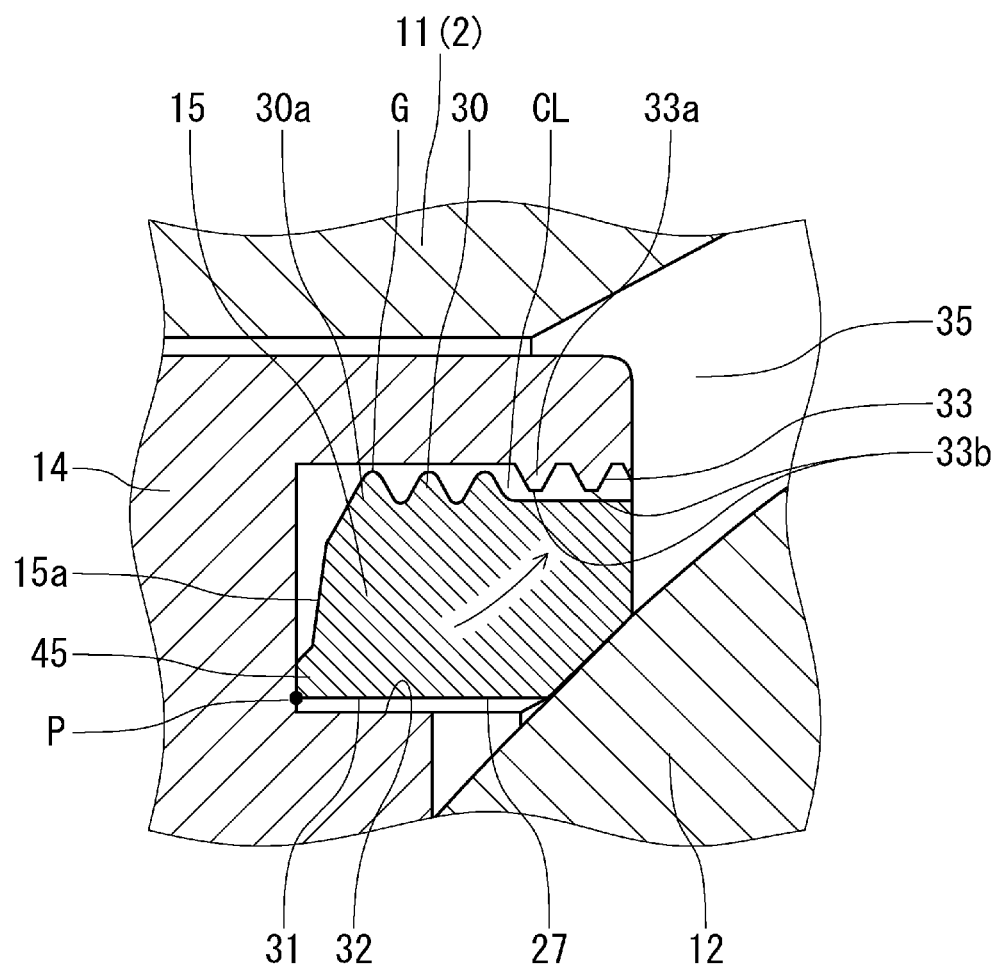
FIG. 8 is a main-part enlarged sectional view of a second embodiment of a trunnion-type ball valve of the present invention.

FIG. 8 shows a second embodiment of a trunnion-type ball valve of the present invention. Note that, in this embodiment and thereafter, the parts which are the same as those of the above described embodiment are expressed by the same reference signs, and the explanations thereof are omitted.

Herein, as shown in FIG. 8, when the ball seat 15 is pressed against the ball 12, deforming force in a diameter-increasing direction along the spherical surface of the ball 12 as shown by an arrow is applied particularly to the seal-surface side of the ball seat 15 by this pressing. As a result, the seal position of the ball seat 15 and the ball 12 may be misaligned.

Meanwhile, if the ball seat 15 undergoes diameter increase and is excessively pressed against the female thread part 33 provided on the attachment groove 32 of the seat retainer 14, the ball seat 15 may be damaged. Such a diameter-increasing phenomenon of the ball seat 15 becomes more notable when a fast-flow fluid enters the narrow space of the ball 12 and the ball seat 15 in a slightly opened state of the valve main body 10 as shown in FIG. 7.

In order to prevent this, in the present embodiment, distal-end side of the thread ridge 33a of the female thread part 33 is cut away to provide a surface 33b parallel to the outer periphery of the ball seat 15. As a result, stress concentration at the abutting part of the thread ridge 33a and the ball seat 15 can be alleviated, and damage of the ball seat 15 can be prevented.

Moreover, by setting the inner diameter of the parallel surface 33b to a dimension close to the outer diameter of the all seat 15, diameter increase of the ball seat 15 can be suppressed, and misalignment in the seal position of the ball seat 15 and the ball 12 can be reduced.

Figure 9:
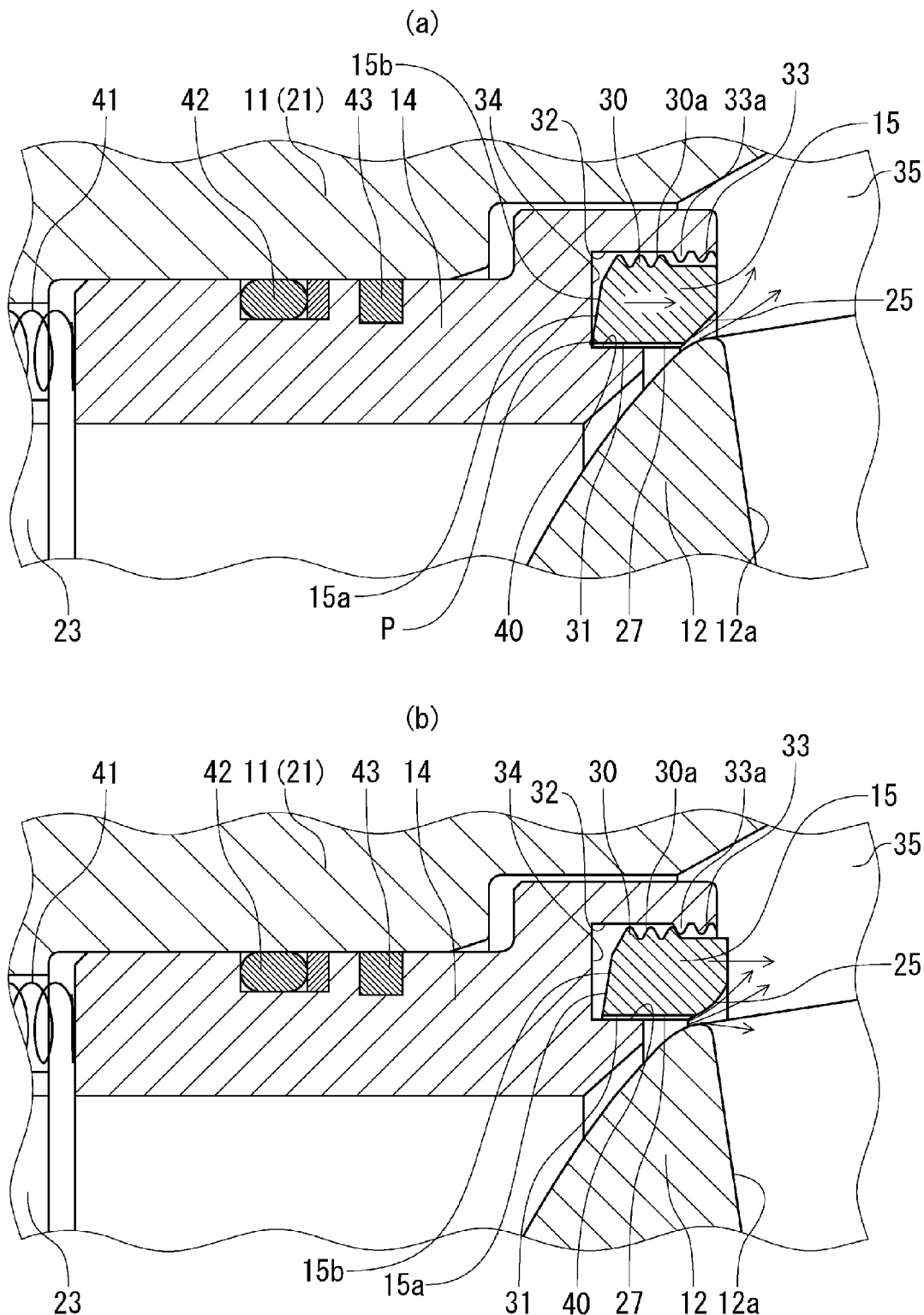
FIG. 9 shows main-part enlarged sectional views of a third embodiment of a trunnion-type ball valve of the present invention.

FIG. 9 shows a third embodiment of a trunnion-type ball valve of the present invention. In this embodiment, a tilted surface 15b tilted toward the inner diameter is formed on the back-surface-15a side of the ball seat 15 so that sealing between the back surface 15a of the ball seat 15 and the attachment groove 32 of the seat retainer 14 is carried out at the seal point P at a position of the tilted surface 15b that is the closest to the inner diameter. As a result, in the full opened state shown in FIG. 1 or in the full closed state shown in FIG. 3, the fluid pressure from the flow channel 23 is prevented from entering the back surface 15a of the ball seat 15.

Moreover, in above described FIG. 8, while the back surface 15a of the ball seat 15 is caused to be a surface which is parallel to the bottom surface of the attachment groove 32 of the seat retainer 14 and is orthogonal to the flow-channel central axis O of FIG. 1, an annular convex part 45 may be provided at the seal point P at the position closest to the inner diameter. In this case, the space to the attachment groove 32 of the seat retainer 14 can be sealed by this annular convex part 45 in the innermost diameter side of the back surface 15a of the ball seat 15.

Figure 10:
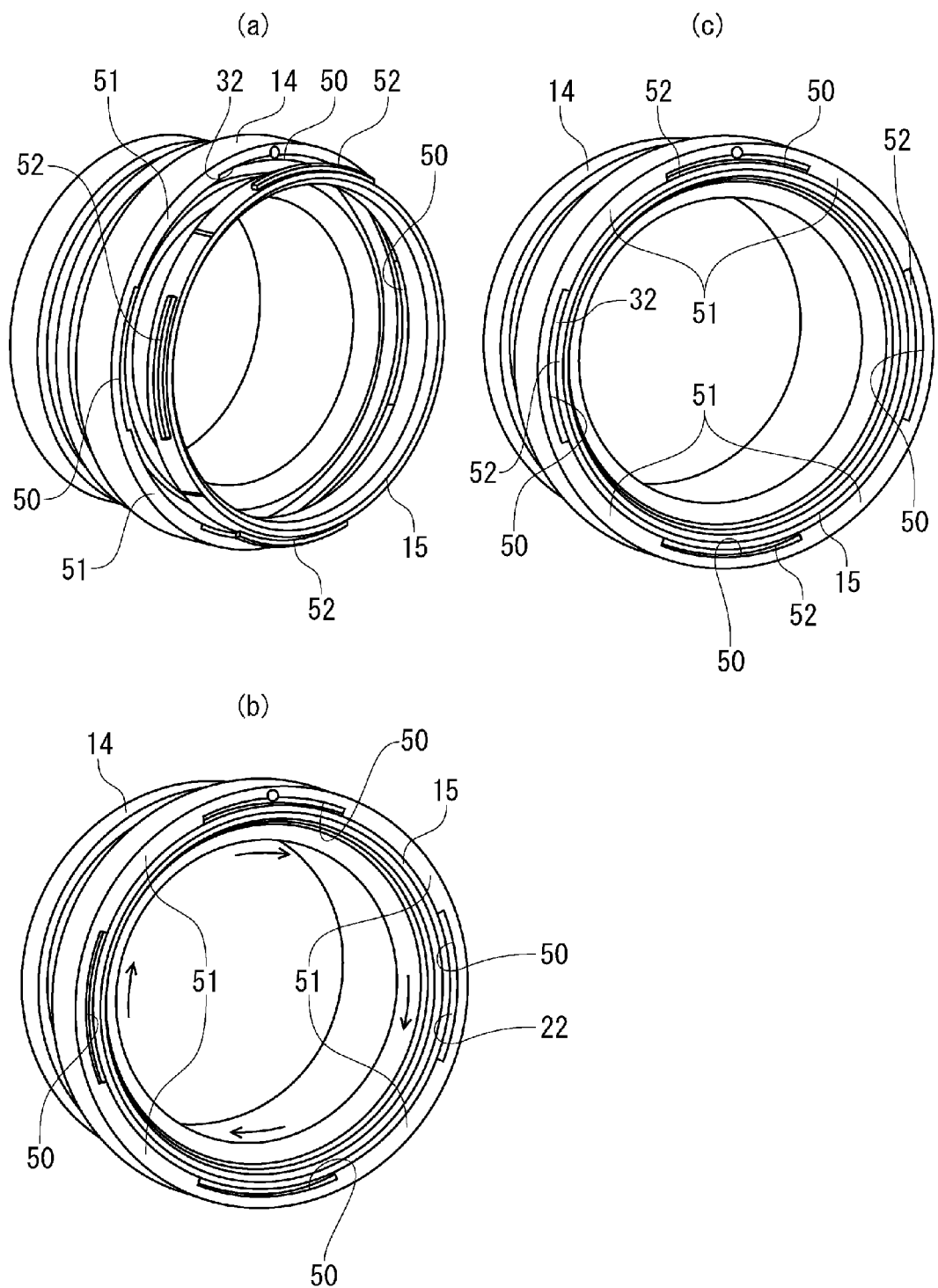
FIG. 10 shows perspective views showing a main part of a fourth embodiment of a trunnion-type ball valve of the present invention.

FIG. 10 shows a seat retainer and a ball seat of a fourth embodiment of a trunnion-type ball valve of the present invention. In this embodiment, as shown in FIG. 10 (a), an annular edge part 51 having cut-away parts 50 at 2 to 4 locations in the circumferential direction is provided instead of the female thread part provided on the inner periphery of the attachment groove of the seat retainer 14, and, on the other hand, annular convex parts 52 at 2 to 4 locations corresponding to the above described cut-away parts 50 are provided in the circumferential direction instead of the male thread part provided on the outer periphery of the ball seat 15.

When the ball seat 15 is to be attached to the seat retainer 14, the ball seat 15 is inserted in the seat retainer 14 in a state in which the annular convex parts 52 are meeting the positions of the cut-away parts 50 as shown in FIG. 10 (b), and, then, the ball seat 15 is rotated in the direction of arrows of FIG. 10 (b) with respect to the seat retainer 14 until the annular convex parts 52 shown in FIG. 10 (c) are at the positions opposed to the annular edge part 51. As a result, in FIG. 10 (c), the annular convex parts 52 are engaged with the annular edge part 51, and, while attaching the ball seat 15 in a free state, in other words, a state movable with respect to the attachment groove 32 by this rotary engagement, fall-off thereof can be prevented.

Figure 11:
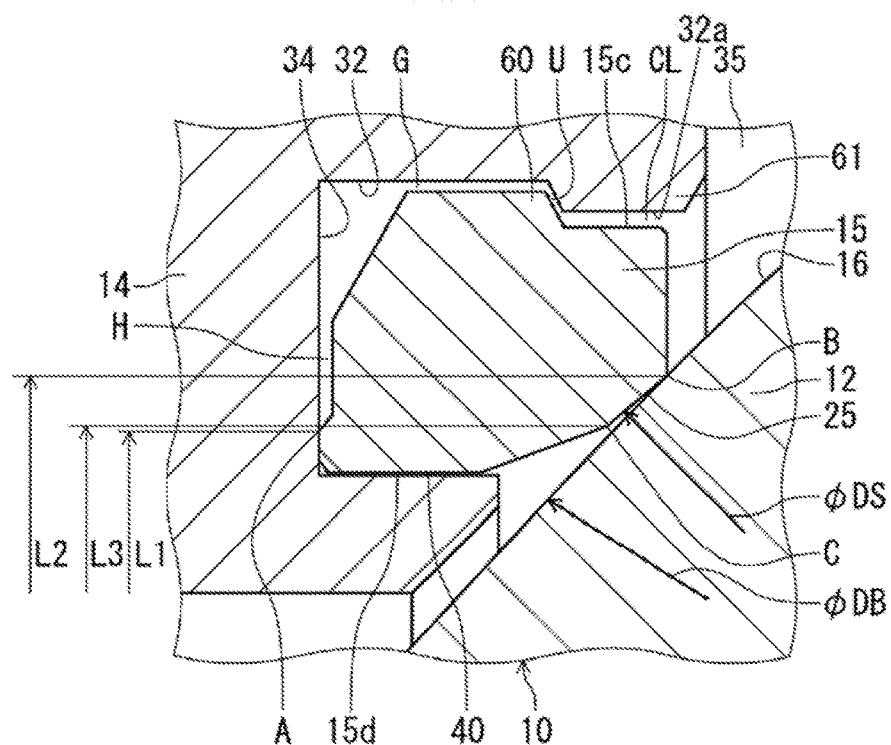
FIG. 11 is a partially enlarged vertical sectional view showing a fifth embodiment of a trunnion-type ball valve of the present invention.

FIG. 11 shows a fifth embodiment of a trunnion-type ball valve of the present invention.

In this embodiment, an A part is annularly formed to project in the attachment-groove-32 side of the ball seat 15, and the A part can abut the attachment groove 32 to carry out back-surface sealing and is provided so as to serve as serve as a supporting-point position. The ball seat 15 is attached in a state in which it is prevented from protruding from the attachment groove 32 and is elastically deformable in the direction of opening the ball-12 side centrally from the supporting-point position A part and in a free state in which the ball seat is movable in the direction of the flow-channel axial core (flow-channel central axis) O of the valve main body 10 of FIG. 12.

In this case, an inner-diameter dimension L1 of the A part is provided in the side closer to the inner diameter than the seal surface 25 serving as a seal part of the ball seat 15 is, and the A part is annularly formed to project in this manner.

As a result, a gap H is formed between the ball seat 15 and the bottomed hole 34 of the attachment groove 32. The ball seat 15 is provided so that, in a case of high pressure, it is elastically deformed to be opened by using the A part as a supporting point and seals the seal surface 25 with the ball 12 from the outer diameter toward the inner diameter side at least in a surface-contact state. In this process, since the gap H is provided, the gap H also contributes to a rotary action when the ball seat 15 is elastically deformed so as to be opened.

The seal surface 25 is formed of a spherical-surface part, which is a spherical surface which can be brought into surface-contact with the outer periphery of the ball 12, a sealing part C is formed in the primary side of the seal surface 25 in the direction of the flow channel 23, a sealing part B is formed in a secondary side thereof, and the sealing part B is provided so that it can be brought into line contact with the ball 12 in a case of low pressure.

The positional relation of the A part serving as the supporting-point position and the sealing part B and the sealing part C, which are the seal surface 25, is provided so that A<C<B is satisfied with respect to the inner-diameter dimensions of the A part, the sealing part B, and the sealing part C and so that "the inner-diameter dimension L1"<"inner-diameter dimension L3"<"inner-diameter dimension L2", wherein the inner-diameter dimension of the sealing part B is L2, and the inner-diameter dimension of the sealing part C is L3.

Figure 12:
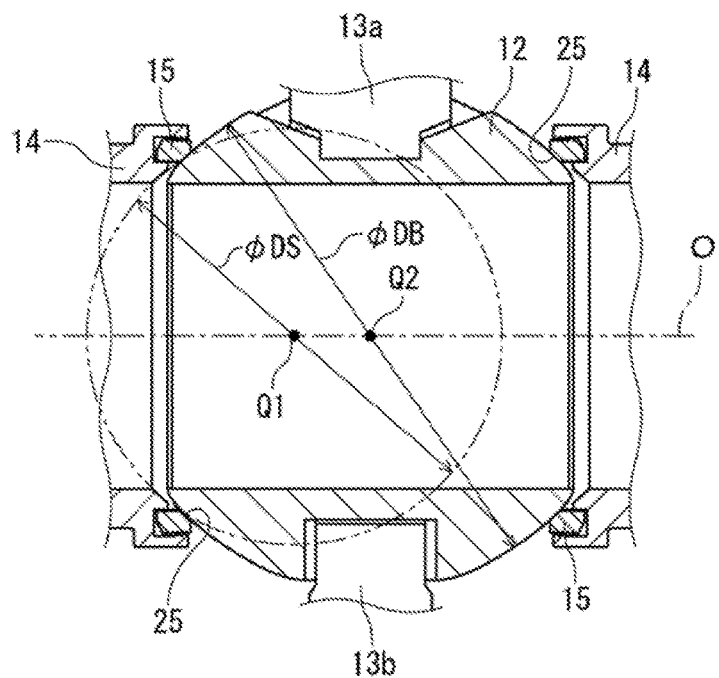
FIG. 12 is an enlarged sectional view showing a state in which a ball seat of FIG. 11 is sealed.

Furthermore, in an initial stage of assembly in which the ball seat 15 is attached to the attachment groove 32 and in a case in which the fluid pressure is a low pressure, an inner diameter φDS from the sealing part C to the sealing part B of the seal surface 25 is different from a sphere diameter φDB of the ball 12, and they are formed to have dimensions of different diameters. In the present embodiment, the inner diameter φDS has a shape of a reduced diameter than the ball sphere diameter φDB, in other words, they are formed so as to satisfy a relation: "the seal-part inner diameter φDS"<"the ball sphere diameter φDB". As shown in FIG. 12, both of a center Q1 of the inner diameter φDS and a center Q2 of the ball sphere diameter φDB are disposed on the flow-channel central axis O of the valve main body 10.

By virtue of these, in a case of the initial stage of assembly or a case in which the fluid pressure is a low pressure, contact of the sealing part B with respect to the ball 12 is maintained in a line contact state, and the sealing part C becomes a non-contacting state with respect to the ball surface 16.

A predetermined clearance CL is provided between the inner peripheral surface 32a of the attachment groove 32 and the seal-surface-side outer peripheral surface 15c of the ball seat 15. In a case of high pressure, the ball seat 15 is configured to be opened to the clearance-CL side, and excessive opening is configured to be suppressed.

In the back side of the attachment groove 32, a projection-shaped engagement part 60 is formed on an outer peripheral surface 15c by a length of about the half of the attachment-direction thickness of the ball seat 15. On the other hand, a projection-shaped latch part 61 is formed on the attachment groove 32 of the seat retainer 14 by about the half the length of the attachment groove 32 from the opening side. The above described clearance CL is provided between at least the inner peripheral surface 32a of the latch part 61 and the outer-peripheral-surface-15c side which is in the ball-12 side than the engagement part 60 of the ball seat 15.

In the back side of the latch part 61 of the seat retainer 14, the bottomed hole 34 having a larger diameter than the outer diameter of the engagement part 60 is provided. The depth of the bottomed hole 34 is formed to be larger than the length of the engagement part 60, and the inner diameter of the bottomed hole 34 is formed to be somewhat larger than the outer diameter of the engagement part 60.

To the seat retainer 14, the ball seat 15 is attached to the attachment groove 32 in a state in which the engagement part 60 is housed in the bottomed hole 34. After attachment of the ball seat 15, the rear-end side of the engagement part 60 and the rear-end side of the latch part 61 are opposed to each other so as to be mutually latchable in the insertion direction of the engagement part 60; as a result, while preventing protrusion of the ball seat 15 from the attachment groove 32, the ball seat 15 becomes a free state.

After attachment of the ball seat 15 to the seat retainer 14, the communication part 40, which communicates the cavity 35 and the upstream side of the ball 12, is provided between the inner-peripheral-surface-27 side and the outer-peripheral side (the engagement-part-60 side) of the ball seat 15. By virtue of this, when an excessive pressure due to an abnormal pressure rise in the cavity 35 of the valve main body 10 in a case of full close or in a case of full open is generated, in other words, when a high pressure is generated in the cavity 35 to exceed the fluid pressure in the flow channel 23, the seat retainer 14 is moved in the direction opposite to the ball 12 by the self-tension utilizing this high pressure, the ball seat 15 is pushed out to the ball-12 side by the above described excessive pressure which has flowed into the back-surface-15a side of the ball seat 15 in the attachment groove 32, and, at this point, the excessive pressure caused by the abnormal pressure rise in the cavity 35 is configured to be relieved into the flow channel 23 via the communication part 40.

The trunnion-type ball valve of this embodiment is suitable in a case of a large diameter of 8 inches or more. In the present embodiment, for example, a case of the valve main body 10 having a size 12 B of a class 600 has: a ball-seat material: PTFE, a ball sphere diameter: φ460 mm, the inner diameter φDS of the seal part is reduced by about 3% to 5% with respect to the ball sphere diameter φDB, the dimensional difference between the inner diameter of the sealing part C (the inner-diameter dimension L3) and the inner diameter of the A part serving as the supporting-point position (the inner-diameter dimension L1): 2 mm or less (1 mm or less in a radial direction), a dimensional difference between the inner diameter of the sealing part B (the inner-diameter dimension L2) and the inner diameter of the sealing part C (inner-diameter dimension L3): 2 mm or more (1 mm or more in a radial direction). In this case, the elastic deformation of the ball seat 15 of opening toward the ball-12 side in a case of high-pressure load is expected to be increased by a diameter of about 1°.

Note that the seal surface 25 of the ball seat 15 may have a shape other than a spherical surface part as long as it is provided in the vicinity of sealing with the ball 12 and can carry out sealing by line contact or surface contact with the ball 12 depending on the level of the fluid pressure. For example, the seal surface may be formed in a taper shape or a circular-arc surface shape.

When the ball seat 15 is to be attached to the seat retainer 14, the ball seat 15 is inserted from the opening side in the direction of the attachment groove 32 so as to push-in the engagement part 60 with respect to the latch part 61. When the engagement part 60 reaches the bottomed hole 34, attachment of the ball seat 15 is completed, and the ball seat 15 is attached in a retained and free state with respect to the seat retainer 14. In this process, since the depth of the bottomed hole 34 is longer than the length of the engagement part 60 as described above, the engagement part 60 reliably moves over the region of the latch part 61, and the engagement part 60 is housed in the bottomed hole 34.

After insertion of the ball seat 15, the clearance CL is formed between there and the attachment groove 32, and the clearance CL enables elastic deformation in the direction of opening centrally from the A part while using the ball-12 side of the ball seat 15 as a supporting-point position.

As shown in FIG. 11 between the engagement part 60 and the latch part 61, a space U is provided in the insertion direction (the direction of the axial core O of the flow channel of FIG. 1). Since the inner diameter of the bottomed hole 34 is provided to be somewhat larger than the outer diameter of the engagement part 60, a gap G in a radial direction is also provided therebetween. This gap G enables the ball seat 15 to be moved forward/backward in a state with low sliding resistance in the range of the space U of the seat retainer 14.

The setting of dimensions such as the sizes of the clearance CL, the space U, and the gap G is set in consideration of cold/warm differences depending on differences in the environmental temperature upon assembly and assembly locations. The case of the present embodiment is provided so as to support the assembly temperatures which are maximally 40° C. in the summer and minimally 10° C. in the winter.

In the valve main body 10, if the fluid pressure in the upstream side of the flow channel 23 is a low pressure, as shown in FIG. 11, in a state in which the A part of the ball seat 15 is abutting the bottom-surface side of the attachment groove 32, the sealing part B maintains a state in which it is in line contact with and sealing the ball 12. This sealing by the line contact has low sealing force compared with sealing by surface contact, but reliably prevents leakage in this case of low pressure without causing abrasion that impairs sealing performance since the fluid is at the low pressure and therefore does not reach the yield point of the ball-seat material.

Figure 13:
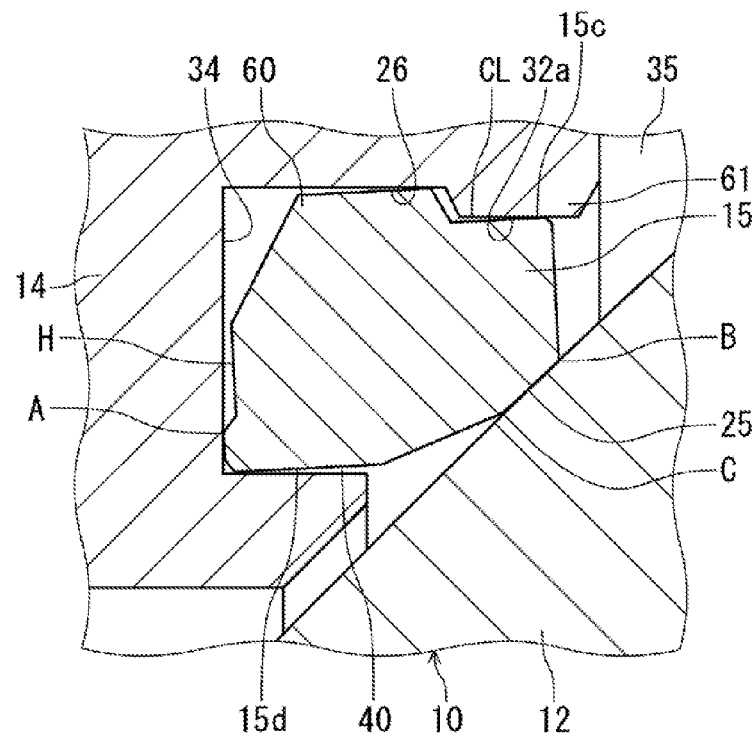
FIG. 13 is a partially-omitted enlarged sectional view showing the relation between a ball and a ball seat.
Figure 14:
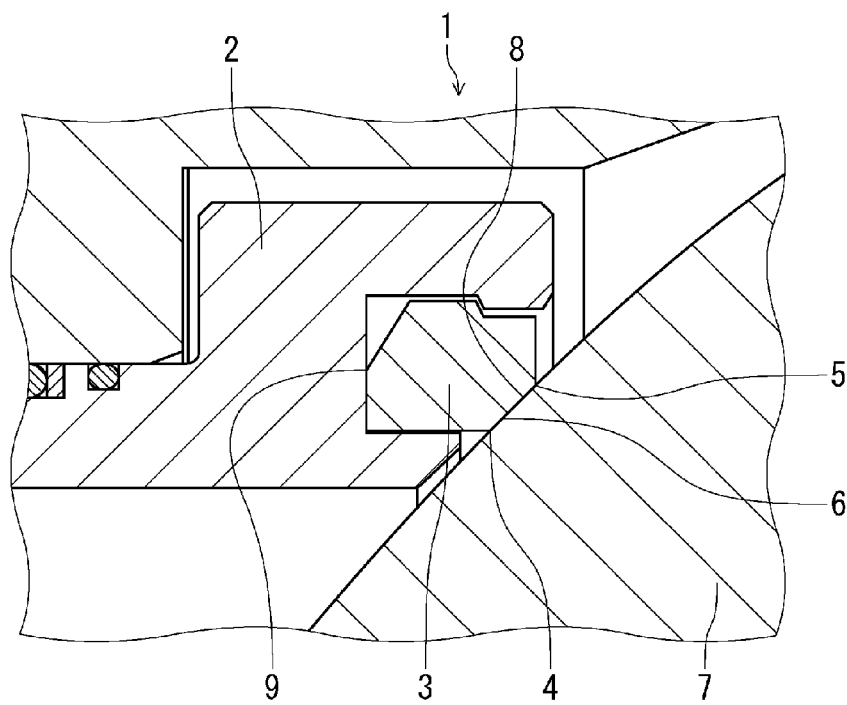
FIG. 14 is a main-part sectional view showing a vicinity of a primary-side part of a conventional trunnion-type ball valve.
Figure 15:
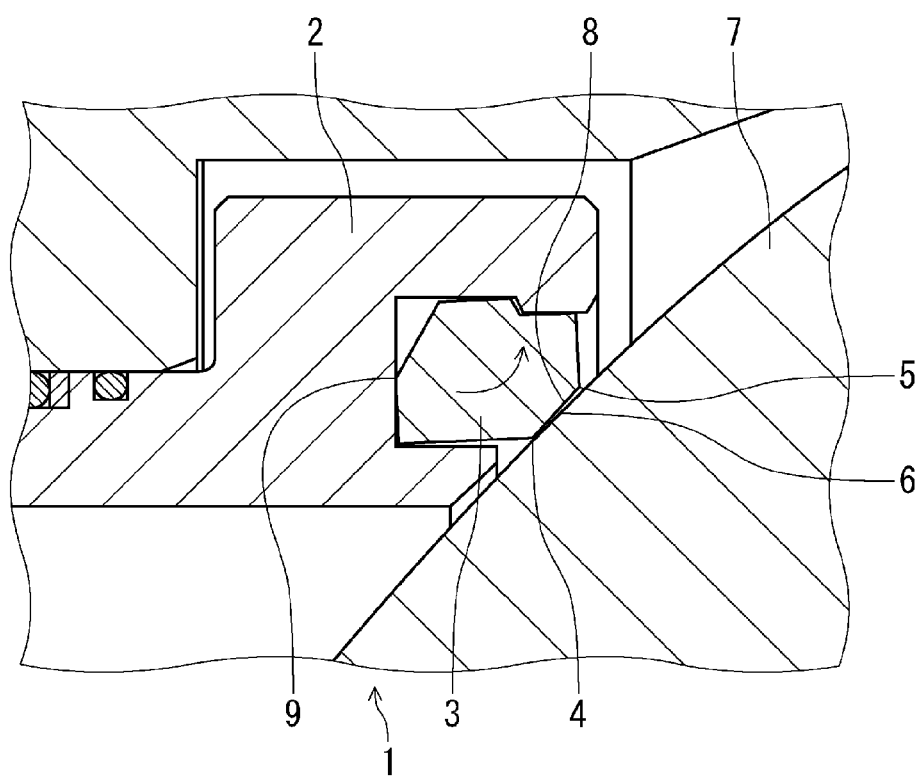
FIG. 15 is a main-part sectional view showing a state in which a ball seat of FIG. 14 is sealed.

If a high fluid pressure is applied, the force utilizing the high fluid pressure is applied to the seat retainer 14 in addition to the elastic force of the coil spring 41. Therefore, the ball seat 15 is further pushed to the ball-12 side, the ball seat 15 is elastically deformed in the direction of opening in the ball-12 side centrally from the A part depending on the level of the fluid pressure as shown in FIG. 13 and seals the seal surface 25 from the outer-diameter side toward the inner-diameter side with respect to the ball 12 at least in a surface-contact state. As a result, the high-pressure fluid can be reliably sealed.

In this case, in FIG. 11, the positional relation of the A part serving as the supporting-point position and the sealing part B and the sealing part C serving as seal parts are A<C<B with respect to inner-diameter dimensions, and the sealing part B is positioned in the outer diameter side compared with the A part. Therefore, in the rotary action of FIG. 13, the sealing-part-B side is rotated to the left so as to be moved in the direction to get away from the ball 12, and this rotation causes the sealing-part-C side, which has been separated from the ball 12 before, to be reliably in surface-contact with the ball 12.

Since the predetermined clearance CL is provided between the attachment groove 32 and the ball seat 15, an operation in which the seal-surface-25 side is deformed in the opening direction is prevented from being disturbed; and, since the outer peripheral surface 15c of the ball seat 15 contacts the inner peripheral surface 32a of the attachment groove 32, the sealing state with respect to the ball 12 can be ensured by suppressing excessive opening of the ball seat 15.

Hereinabove, the embodiments of the present invention have been described in detail. However, the present invention is not limited to the description of the above described embodiments, and various modifications can be made within a range not departing from the spirit of the invention described in claims of the present invention.

The invention claimed is:

1. A trunnion-type ball valve comprising:
   a valve body;
   a ball disposed in a flow channel through the valve body, the ball having a through hole;
   a seat retainer disposed on one side of the ball, the seat retainer having an attachment groove formed therein;
   a ball seat secured in the attachment groove, the ball seat being attached in a free and movable state relative to the attachment groove;
   a protrusion preventing structure for preventing the ball seat from protruding from the attachment groove, the protrusion preventing structure having i) an engagement part provided on an inner peripheral surface of the attachment groove, and ii) a latch part provided on an outer peripheral surface of the ball seat; and
   a communication part provided between an inner peripheral surface of the ball seat and the attachment groove,
   wherein a seal diameter of a seal formed between the ball seat and the ball is larger than a back-surface side seal diameter of a seal formed between the back-surface side of the ball seat and the seat retainer, and
   by utilizing an excessive pressure due to an abnormal pressure rise in a cavity upon full close or upon full open, the seat retainer is moved in a direction opposite to the ball by self-tension and the ball seat is pushed out to the ball side, the excessive pressure being set so as to be relieved into the flow channel via the communication part.

2. The trunnion-type ball valve according to claim 1, wherein the engagement part is opposed to the latch part so as to be mutually latchable in an insertion direction to prevent protrusion of the ball seat from the attachment groove of the seat retainer.

3. The trunnion-type ball valve according to claim 2, wherein a female thread part provided on the inner periphery of the attachment groove serves as the engagement part, a male thread part of the ball seat serves as the latch part and is configured to be screwed with the female thread part, and a rear end side of the male thread part and a rear end side of the female thread part are provided so as to be mutually latchable to prevent protrusion of the ball seat.

4. The trunnion-type ball valve according to claim 3, wherein a thread ridge at an inner end of the female thread part and a thread ridge at an outer end of the male thread part are configured to be mutually latched to prevent protrusion of the ball seat.

5. The trunnion-type ball valve according to claim 3, wherein at least one relief groove constituting the communication part is formed in the inner peripheral surface of the ball seat or in the attachment groove of the seat retainer so as to be opposed to the inner peripheral surface of the ball seat.

6. The trunnion-type ball valve according to claim 2, wherein at least one relief groove constituting the communication part is formed in the inner peripheral surface of the ball seat or in the attachment groove of the seat retainer so as to be opposed to the inner peripheral surface of the ball seat.

7. The trunnion-type ball valve according to claim 1, wherein at least one relief groove constituting the communication part is formed in the inner peripheral surface of the ball seat or in the attachment groove of the seat retainer so as to be opposed to the inner peripheral surface of the ball seat.

8. The trunnion-type ball valve according to claim 1, wherein an inner-diameter dimension of a supporting-point position part A of the back-surface sealing of the ball seat is provided in a side closer to an inner diameter than a seal part of the ball seat is, the ball seat in a case of high pressure is configured to be elastically deformed so as to be opened while using the supporting-point position part A as a supporting point and sealing the seal part from an outer-diameter side toward an inner-diameter side at least in a surface-contact state.

9. The trunnion-type ball valve according to claim 8, wherein a positional relation of the supporting-point position part A serving as the supporting-point position and a sealing part B and a sealing part C serving as the seal part is A<C<B with respect to the inner-diameter dimension.

10. The trunnion-type ball valve of claim 9, wherein, in a case of an initial stage of assembly or a low fluid pressure, the sealing part B maintains a line-contact state, and the sealing part C is in a state not contacting a surface of the ball.

11. The trunnion-type ball valve according to claim 10, wherein the seal part of the ball seat is formed into a spherical surface, a center of the spherical surface is disposed on a flow-channel axial core in the body as well as a center of the ball, and the inner diameter thereof is formed to be reduced relative to a spherical shape of the ball.

12. The trunnion-type ball valve according to claim 9, wherein the seal part of the ball seat is formed into a spherical surface, a center of the spherical surface is disposed on a flow-channel axial core in the body as well as a center of the ball, and the inner diameter thereof is formed to be reduced relative to a spherical shape of the ball.

13. The trunnion-type ball valve according to claim 8, wherein the seal part of the ball seat is formed into a spherical surface, a center of the spherical surface is disposed on a flow-channel axial core in the valve body as well as a center of the ball, and the inner diameter thereof is formed so as to be reduced relative to a spherical shape of the ball.

14. The trunnion-type ball valve according to claim 8, wherein a predetermined clearance is provided between an inner peripheral surface of the attachment groove and a seal-surface-side outer peripheral surface of the ball seat so that the ball seat can be opened in a case of high pressure and so that excessive opening thereof can be suppressed.

15. The trunnion-type ball valve according to claim 14, wherein a clearance is provided between an inner peripheral surface of the latch part formed on the attachment groove and an outer-peripheral-surface-side of the ball seat.

16. A trunnion-type ball valve having a seat retainer disposed to attach a ball seat to one side or both sides of a ball having a through hole provided in a body, the ball turnably provided via a stem, and the ball seat attached in a free and movable state in an attachment groove formed in the seat retainer so as to prevent the ball seat from protruding therefrom,
   wherein an excessive pressure due to an abnormal pressure rise in a cavity upon full close or upon full open is configured to be relieved into a flow channel via a communication part provided between an inner peripheral surface of the ball seat and the attachment groove by moving the seat retainer in a direction opposite to the ball by self-tension utilizing the pressure and pushing-out the ball seat to a side of the ball by the excessive pressure flowed into a rear-surface side of the ball seat in the attachment groove, wherein an inner-diameter dimension of a supporting-point position part A of the back-surface sealing of the ball seat is provided in a side closer to an inner diameter than a seal part of the ball seat is, the ball seat in a case of high pressure is configured to be elastically deformed so as to be opened while using the supporting-point position part A as a supporting point and sealing the seal part from an outer-diameter side toward an inner-diameter side at least in a surface-contact state.

* * * * *